Dec. 24, 1940. C. B. SHANE Re. 21,676

OVERCOAT

Original Filed Feb. 4, 1938

Inventor:
Conrad B. Shane,
By Banning & Banning
Attorneys.

UNITED STATES PATENT OFFICE 21,676

OVERCOAT

Conrad B. Shane, Wilmette, Ill.

Original No. 2,128,193, dated August 23, 1938, Serial No. 188,658, February 4, 1938. Application for reissue March 25, 1940, Serial No. 325,924

9 Claims. (Cl. 2—97)

This invention relates to a sleeved outer garment, such as a top coat or overcoat. The present improvements have to do with the construction of such a garment by which it may be fitted with a removable body lining, the lining being equipped with sleeve lining members which may be secured detachably in place so that the coat which is complete in itself may be used either with or without any lining at all. More particularly, as will hereinafter appear, my invention is concerned with an improved connection between the body lining and its sleeve linings, affording a proper suspension support therefor without impairing freedom of movement on the part of the wearer.

At the present time sleeved topcoats and overcoats having a sleeveless removable lining have attained considerable popularity. The use of such sleeveless linings, however, often leaves something to be desired, viz., inner sleeves within the coat sleeves or linings for extra warmth to the wearer's arms. The application of sleeves to a lining, if made according to usual tailoring procedure, is relatively expensive, and may not combine properly with the coat sleeves when the lining sleeves are fitted thereinto. It is with a view to overcoming such deficiencies, inter alia, that the present improvements have been devised.

An exemplification of this invention is set forth in the accompanying drawing wherein—

Figure 1:
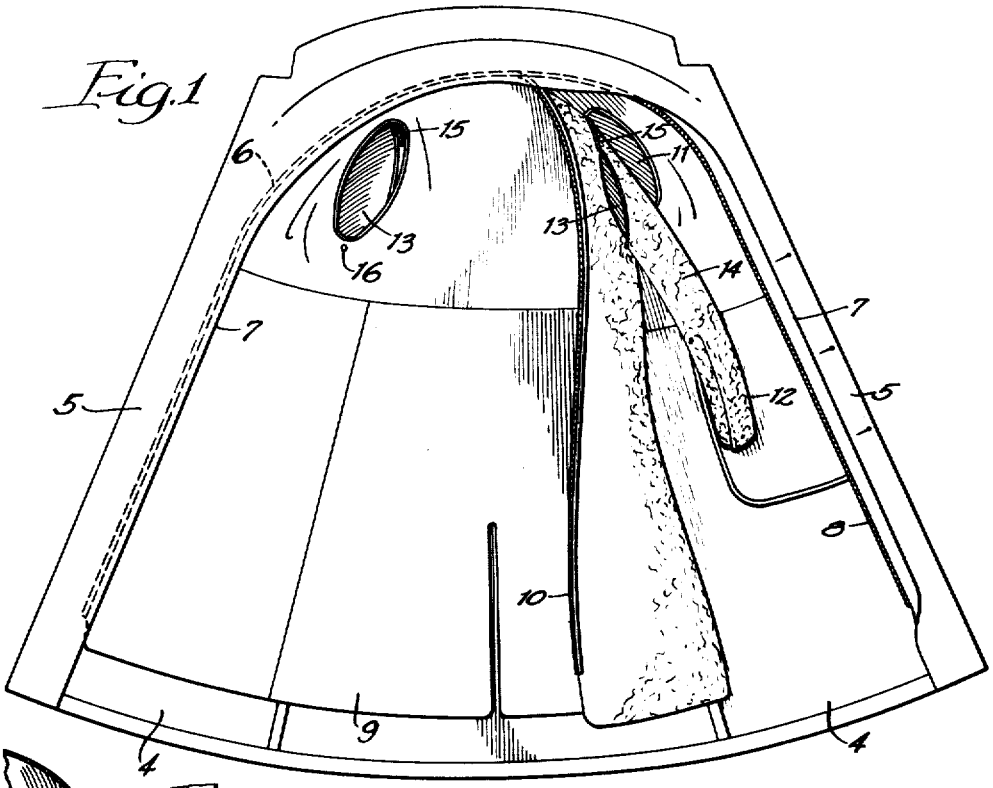
Figure 2:
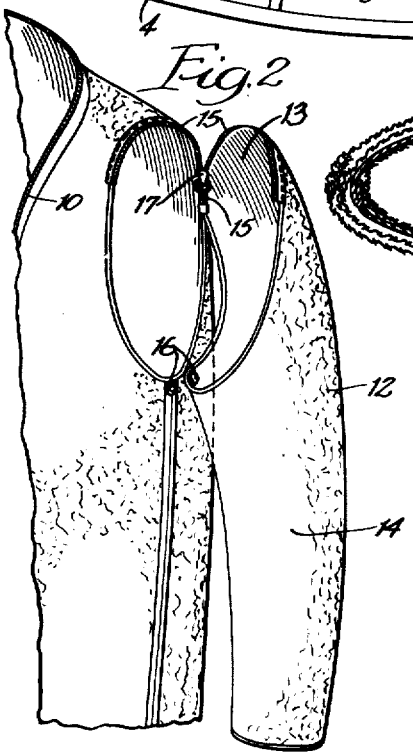
Figure 3:
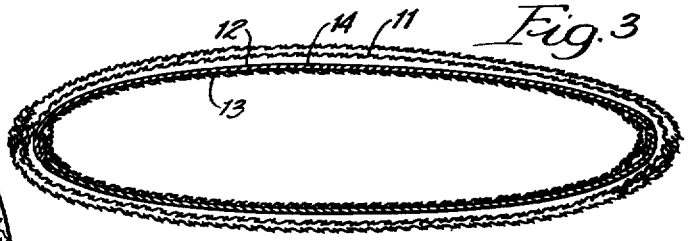

Figure 1 is a view of an overcoat or topcoat, looking toward the inside, and showing the full lining therein partly detached, one of the lining sleeves being outside the coat sleeve into which it is designed to fit;

Fig. 2 which is a fragmentary view shows one side of the lining to which an associated sleeve is partly connected; and Fig. 3 is an enlarged transverse section through one coat sleeve having a lining sleeve fitted therewithin.

The present topcoat or overcoat, which is made from suitable fabric material, comprises opposed fronts 4 each having an associated facing 5 which may extend for the full length of the garment, as is customary. A connection line 6 which extends downwardly from the shoulder region for a substantial distance lies inwardly of the facing edge 7 which is remote from the free edge of the garment front. The facing may also be joined to a tape (not shown) which is attached invisibly to the front along a line which lies inwardly of the facing edge 7. The portion of the facing which is thus free forms in effect a flap to the under side of which is secured a second tape (not shown) which carries a row of metallic hook fasteners 8. This row of fasteners lies beneath the flap so as to be concealed from view, and is also located relatively close to the stitching line 6, all as explained at length in my Patent No. 2,069,628, granted February 2, 1937. The garment full body lining 9 is equipped around its edges (except the bottom) with a row of complementary hook fasteners 10 adapted to interengage the row of fasteners 8 in response to operations of a slide as is customary. Such a lining may accordingly be secured in place by a connection which is continuous and also detachable, permitting the lining to be removed whenever desired. The present garment will, of course, be constructed with the usual arm holes, sleeves 11, collar, pockets, etc.

My present invention is directed toward the combination with a removable body lining of the general kind just set forth, of a pair of sleeve linings each joined thereto in a manner which will facilitate application of the sleeve linings to the body lining and of the body lining with attached sleeve linings to the garment, which will economize on the material and labor required, which will fit correctly without tailoring, and which will afford full freedom to all usual movements of the wearer's arms. To accomplish these and other ends, each sleeve lining 12 is desirably faced interiorly and exteriorly with materials of unlike characteristics, that 13 within being smooth and that 14 without being relatively rough. With a sleeve lining so formed, the wearer may slide his arms easily in or out whereas the sleeve itself will tend to stay put within the coat sleeve, once it has been inserted therewithin.

Each sleeve lining is opened at its upper end so as to join with the arm hole opening in the body lining, as best shown in Fig. 2. The connection between the sleeve lining and the body lining is not continuous, however, and need not be owing to the special conditions surrounding use of the garment in question. In order to serve the present requirements, I prefer to employ between the body lining and sleeve lining an extended connection 15 over or upon the shoulder and a spot connection 16 therebelow. The former may be conveniently provided by stitching or by complementary rows of hook fasteners together with a slide 17 by which to make or break such connection with ease, and the latter by one or more snap fasteners of conventional type. Such forms of fastening devices while admirably suited to the purposes of my invention should be regarded as examples only. A hook fastener connection thus provided between the body lining and its sleeve linings is not only detachable, but is relatively short as well thus conducing to enhanced ventilation and freedom of movement therebetween. The extended connection over the shoulder affords an ample line of suspension to prevent distortion of the lining portions, while the spot connection therebelow will be sufficient to hold the sleeve lining in place at that point.

In use, the coat complete with is own sleeves, may be worn without any lining at all. In that event it is admirably suited for light weather. For heavier weather the lining, either with or without its own sleeve portions, may be applied to the coat in the manner already indicated. If the lining sleeves are also to be used, they should first be attached in place and then inserted within the sleeves of the coat where they tend to remain smooth and extended by reason of their exterior facings (as of leather or wool) which resist free sliding movement relative to the surface of any material in engagement therewith. If desired, the sleeve linings may be taken out and detached from the body lining without complete removal of the latter from the coat. With the sleeve linings in use, extra warmth is afforded to the arms of the wearer without, however, impairment of freedom of movement because of the loose type of connection at the arm holes of the body lining. Furthermore, the sleeve linings are hung or suspended from the body lining throughout extended lines of connection which lie close to the line of connection between the body lining and the coat (see Figs. 1 and 2). This is important because the smooth appearance of the garment should be preserved in any event. The herein described manner of suspension of the body lining with respect to the coat and of the sleeve linings with respect to the body lining is such that there is an even distribution of the load without localized pulling or straining; and the absence of any but a spot connection between the sleeve linings and body lining at points below the shoulder assures of no interference with this smooth hanging effect which is so essential in a high grade outer garment.

I claim:

1. In an outer garment, the combination of a sleeved coat, a body lining fitted within the coat, a detachable connection between the body lining and coat extending in a line over the two shoulders and past the neck therebetween, a pair of sleeve linings, and an extended detachable connection between each sleeve lining and the body lining disposed in a line over the shoulder in proximity to the detachable connection line between the body lining and coat.

2. In an outer garment, the combination of a sleeved coat, a body lining fitted within the coat, a detachable connection between the body lining and coat extending in a line over the two shoulders and past the neck therebetween, a pair of sleeve linings, an extended detachable connection between each sleeve lining and the body lining disposed in a line over the shoulder in proximity to the detachable connection line between the body lining and coat, and a detachable spot connection between each sleeve lining and the body lining spaced from the extended connection therebetween.

3. In a sleeved outer garment, a body lining having means for attachment to said outer garment, there being arm holes in the body lining, a pair of sleeve linings adapted for attachment to the body lining one at each arm hole therein, and a detachable connection directly between each sleeve lining and the body lining extending through a region above the body lining arm holes, said lining elements being free of said direct connection therebeyond whereby to furnish a localized suspension support for the sleeve linings from the shoulder portions of the body lining.

4. In a sleeved outer garment, a body lining having means for attachment to said outer garment, there being arm holes in the body lining and a pair of sleeve linings connected directly to the body lining one at each arm hole therein, and said connection being substantially continuous between points on opposite sides of each sleeve lining and the body lining and extending through and confined to a region above the lining arm holes leaving the continuing arm hole portions of said sleeve and body linings apart for relative movements within the outer garment whereby to furnish a localized shoulder suspension support for the sleeve linings.

5. In an outer garment, the combination of a sleeved coat, a body lining fitted within the coat, a detachable connection between the body lining and coat extending in a line over the two shoulders and past the neck therebetween, a pair of sleeve linings, an extended connection between each sleeve lining and the body lining disposed in a line over the shoulder and terminating at points on opposite sides of said shoulder and in proximity to the detachable connection line between the lining and coat, and a spot connection between each sleeve and the lining spaced from the extended connection therebetween.

6. In an outer garment, the combination of a sleeved coat, a body lining fitted within the coat, a detachable connection between the body lining and coat extending in a line over the two shoulders and past the neck therebetween, said body lining comprising sleeve linings, and a continuous connection between each sleeve lining and the body lining disposed over the shoulders and terminating at points on opposite sides of the shoulder and affording a localized suspension support for each sleeve lining whereby to assure an even distribution of the load free of pull or strain between the body lining and the sleeve lining at points opposite the shoulder.

7. In an outer garment, the combination of a sleeved coat, a body lining fitted within the coat, a detachable connection between the body lining and coat, a pair of sleeve linings receivable within the coat sleeves, and a connection between each sleeve lining and the body lining, the sleeve linings being provided with inner and outer facings relatively smooth and rough, respectively, whereby to facilitate sliding arm movements within such sleeve linings and to oppose sliding movements of the sleeve linings within the coat sleeves.

8. In a sleeved outer garment, a body lining fitted within the garment, a detachable connection between the body lining and garment extending in a line over the shoulders, a pair of sleeve linings adapted to be fitted into the sleeves of said garment, an elongated suspension connection between each sleeve lining and the body lining disposed in a line over the shoulder in proximity to the detachable connection between the body lining and garment, said connection terminating at points on opposite sides of said shoulder, and a separate connection for each sleeve lining and the body lining disposed between the ends of each suspension connection permitting relative movement of underarm portions of each sleeve and the body lining within said outer garment.

9. In a sleeved outer garment, a body lining having means for attachment to said garment, there being arm holes in the body lining and a pair of sleeve linings directly connected to and supported by said body lining one at each arm hole therein, and said direct supporting connection between each sleeve lining and said body lining extending over and confined to the region above said body lining arm holes, and said lining elements being separate beyond the ends of said direct supporting connection for relative movement therebetween, whereby to provide localized suspension support for the sleeve linings from said body lining above the arm holes therein.

CONRAD B. SHANE.

DISCLAIMER

Re. 21,676.—*Conrad B. Shane*, Wilmette, Ill. OVERCOAT. Patent dated December 24, 1940. Disclaimer filed October 30, 1941, by the inventor.

Hereby enters the following disclaimer—

In claim 7, the "connection between each sleeve lining and the body lining" is to be limited to a construction having a suspension support which is confined to the region over the shoulders, leaving the sleeve linings relatively free and loose in their under-arm regions, and outer garments to which are detachably fitted sleeved body linings having the sleeve linings otherwise secured are herein expressly disclaimed.

[*Official Gazette November 25, 1941*]